(12) United States Patent
Sawant et al.

(10) Patent No.: US 11,372,742 B1
(45) Date of Patent: Jun. 28, 2022

(54) MINING SOFTWARE SPECIFICATION FROM ONLINE DOCUMENTATION

(71) Applicant: Amazon Technologies, Inc., Seattle, WA (US)

(72) Inventors: Neela Sawant, Jersey City, NJ (US); Anton Emelyanov, Seattle, WA (US); Hoan Anh Nguyen, Bothell, WA (US); Srinivasan Sengamedu Hanumantha Rao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/836,586

(22) Filed: Mar. 31, 2020

(51) Int. Cl.
   *G06F 8/10*      (2018.01)
   *G06F 8/73*      (2018.01)
   *G06F 11/36*     (2006.01)
   *G06F 16/2458*   (2019.01)

(52) U.S. Cl.
   CPC ............ *G06F 11/3616* (2013.01); *G06F 8/10* (2013.01); *G06F 8/73* (2013.01); *G06F 16/2465* (2019.01); *G06F 2216/03* (2013.01)

(58) Field of Classification Search
   CPC ...................................... G06F 8/10; G06F 8/73
   See application file for complete search history.

(56) References Cited

U.S. PATENT DOCUMENTS

| 5,598,511 A * | 1/1997 | Petrinjak ................... G06N 5/04 706/50 |
| 8,527,954 B2 * | 9/2013 | Benameur ........... G06F 11/3608 717/130 |
| 2006/0294502 A1 * | 12/2006 | Das ......................... G06F 8/73 717/129 |
| 2008/0059474 A1 * | 3/2008 | Lim ........................ H04L 67/32 707/E17.106 |
| 2014/0223416 A1 * | 8/2014 | Cohen ..................... G06F 17/40 717/123 |
| 2019/0265969 A1 * | 8/2019 | Campbell ............. G06F 16/173 |
| 2020/0301672 A1 * | 9/2020 | Li .............................. G06F 8/71 |

OTHER PUBLICATIONS

Tao Xie et al., "Data Mining for Sofware Engineering", [Online], pp. 55-62, [Retrieved from Internet on Jun. 29, 2021], <https://ieeexplore.ieee.org/stamp/stamp.jsp?arnumber=5197425>, (Year: 2009).*

(Continued)

*Primary Examiner* — Ziaul A Chowdhury
(74) *Attorney, Agent, or Firm* — Nicholson De Vos Webster & Elliott LLP (57) ABSTRACT

Techniques for generating rules from documentation are described. For example, a method for generating rules may include generating one or more rules from documentation by: extracting a plurality of chunks from the documentation, inferring one or more candidate rules from the extracted chunks, mining the inferred one or more candidate rules to determine at least one of the one or more candidate rules is to be included in rule generation, classifying the at least one mined one or more candidate rules as one or more rules, and extracting information to generate the one or more rules.

20 Claims, 9 Drawing Sheets

(56) References Cited

OTHER PUBLICATIONS

Ren'e Witte et al., "Ontological Text Mining of Software Documents", [Online], pp. 1-12, [Retrieved from Internet on Jun. 29, 2021], <https://www.researchgate.net/profile/Juergen-Rilling/publication/Ontological-Text-Mining-of-Software-Documents.pdf> (Year: 2007).*
Reinhold Plösch et al., "The Value of Software Documentation Quality", [Online], pp. 333-342, [Retrieved from Internet on Feb. 12, 2022], <https://ieeexplore.ieee.org/stamp/stamp.jsp?arnumber=6958422>, (Year: 2014).*
Julio Cezar Zanoni et al., "A Semi-Automatic Source Code Documentation Method for Small Software Development Teams", [Online], pp. 113-119, <https://ieeexplore.ieee.org/stamp/stamp.jsp?tp=&arnumber=5960063>, (Year: 2011).*
Yingkui Cao et al., "Toward Accurate Link between Code and Software Documentation", [Online], pp. 1-15, [Retrieved from Internt on Feb. 12, 2022], <https://link.springer.com/content/pdf/10.1007/s11432-017-9402-3.pdf>, (Year: 2018).*
Andreas Dautovic et al., "Automatic Checking of Quality Best Practices in Software Development Documents", [Online], pp. 208-217, [Retrieved from Internet on Feb. 12, 2022], <https://ieeexplore.ieee.org/stamp/stamp.jsp?arnumber=6004329>, (Year: 2011).*
Amazon Web Services, Inc., "AWS CloudFormation Documentation", Available online at <https://docs.aws.amazon.com/cloudformation/?id=docs_gateway>, 2019, 1 page.

* cited by examiner

FIG. 1

| TABLE 201 ||
|---|---|
| IDENTIFIER 201 | DESCRIPTION 205 |
| NUMBER OF REPOSITORIES | MAXIMUM OF 1,000 PER ACCOUNT |
| REPOSITORY NAMES | ANY COMBINATION OF LETTERS, NUMBERS, PERIODS, UNDERSCORES, AND DASHES BETWEEN 1 AND 100 CHARACTERS IN LENGTH |
| ... | ... |
| ... | ... |
| APPROVERS IN AN APPROVAL POOL | 50 |

*FIG. 2*

SCHEMA BASED DOCUMENT 301

PUBLIC ABSTRACT CLASS
EXTENDS
IMPLEMENTS

ABSTRACT CLASS FOR WRITING TO CHARACTER STREAMS.

FIELD SUMMARY

| MODIFIER AND TYPE | FIELD AND DESCRIPTION |
|---|---|
| TEXT | TEXT |

CONSTRUCTOR SUMMARY

| MODIFIER | CONSTRUCTOR AND DESCRIPTION |
|---|---|
| TEXT | TEXT |

METHOD SUMMARY

| MODIFIER AND TYPE | METHOD AND DESCRIPTION |
|---|---|
| TEXT | TEXT<br>THROWS |

*FIG. 3*

DOCUMENT EXAMPLE 401

"AWSTEMPLATEFORMATVERSION" : "2010-09-09",

"DESCRIPTION" : "AWS CLOUDFORMATION SAMPLE TEMPLATE DYNAMODB_TABLE: THIS TEMPLATE DEMONSTRATES THE CREATION OF A DYNAMODB TABLE. WARNING THIS TEMPLATE CREATES AN AMAZON DYNAMODB TABLE. YOU WILL BE BILLED FOR THE AWS RESOURCES USED IF YOU CREATE A STACK FROM THIS TEMPLATE.",

"PARAMETERS" : {
 "HASHKEYELEMENTNAME" : {
  "DESCRIPTION" : "HASHTYPE PRIMARYKEY NAME",
  "TYPE" : "STRING",
  "ALLOWEDPATTERN" : "[A-ZA-Z0-9]*",
  "MINLENGTH": "1",
  "MAXLENGTH": "2048",
  "CONSTRAINTDESCRIPTION" : "MUST CONTAIN ONLY ALPHANUMBERIC CHARACTERS"
 }

| SOURCE 601 | TARGET 603 | TEXT 605 | PARAMETERS 607 |
|---|---|---|---|
| AWS_CLOUDFRONT.CNF DOC | DISTRIBUTION.ORIGIN.D OMAINNAME | THE BUCKET NAME MUST CONTAIN ONLY LOWERCASE CHARACTERS, NUMBERS, PERIODS, UNDERSCORES, AND DASHES | DATE ADDED |
| AWS_CLOUDFRONT.CNF DOC | DISTRIBUTION.ORIGIN.D OMANNAME | THE BUCKET NAME MUST NOT CONTAIN ADJACENT PERIODS | DATE ADDED |

MINING SOFTWARE SPECIFICATION FROM ONLINE DOCUMENTATION

BACKGROUND

Documentation is the primary mode of communication to explain the logic, implementation, and use of software. For example, documentation provides examples of what to do and what not to do.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for finding rules in documentation.

Documentation can be used manually or automatically to identify software rules and best practices which can be incorporated in integrated development environment (IDE) plugins or code review tools. When new functionality is launched or existing functionality is modified, online official documents are often the first to reflect such change. Sometimes these changes are not reflected in any other sources, including code-generated specification files that might feed third party checkers. Unfortunately, the way to find rules and/or best practices is to manually look for them within documents.

Detailed herein are embodiments that programmatically look for rules and/or best practices in documents and publish the rules and/or best practices for use in code deployment and/or development. This provides an improved rule and/or best practice base as the format of the rule and/or best practice is more consistent and it is less likely that a rule and/or best practice will be missed.

Figure 1:
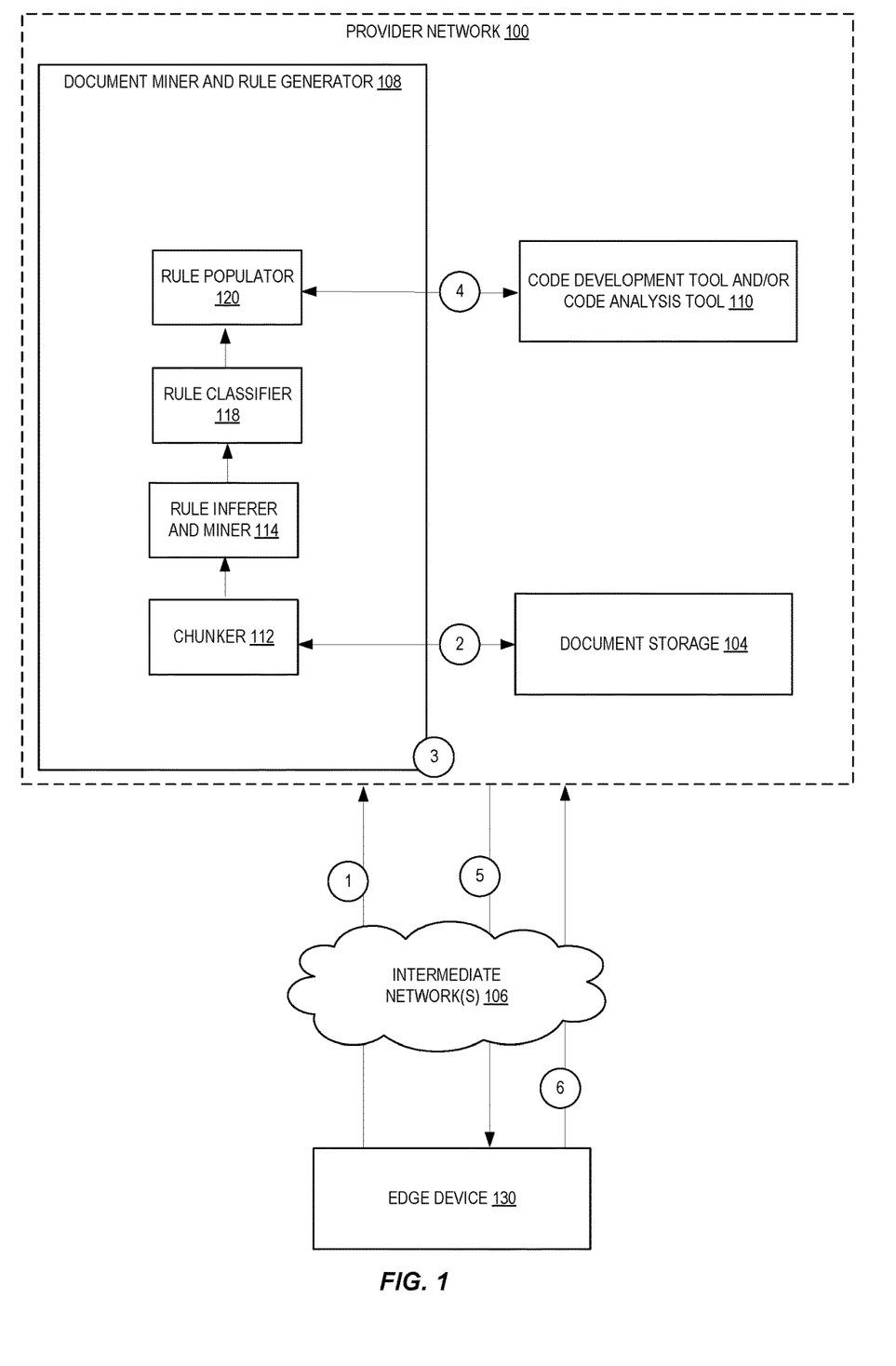
FIG. 1 illustrates embodiments of a system that provides document mining and rule generation.

FIG. 1 illustrates embodiments of a system that provides document mining and rule generation. As shown, a document miner and rule generator 108 (e.g., a web service) retrieves documents from document storage 104, mines those documents for content that may be applicable as a "rule," and then generates rules from that mined content. In particular, the rules a usually associated with code development and/or code analysis tool 110 (e.g., an integrated development environment (IDE)) which may include a linter. Documents may come in many different forms including structured (XML, JSON, HTML, etc.) and unstructured (e.g., user posts).

In general, documentation of two broad categories can be leveraged. By the document miner and rule generator 108: 1) software documentation which is natural language data explaining rules and best practices of software that often contain small code examples to illustrate the point of discussion and 2) documented software which is programming language data containing actual code and often contains small textual snippets to explain the intended behavior, limitations of the code. Software documentation may include authoritative, formal documents, (such as API references and developer guides) and informal documents (such as software blogs). Formal documentation often exhibits a reasonably consistent local grammar or sentence structure because writers tend to model new documents after some shared templates. Note that freestyle text and/or code comments may also be leveraged for rules.

Mining from documentation can often uncover recommendations that require design, account-level, or run-time information. Examples include: 1) design findings such as best practices, 2) account-level findings (e.g., "This value must be unique for the AWS account and cannot be updated after the product is provisioned. (target: AWS::ServiceCatalog::CloudFormationProvisionedProduct.ProvisionedProductName)"), and 3) run-time findings (e.g., "This username must exist in the AWS Directory Service directory for the WorkSpace. (target: AWS::WorkSpaces::Workspace.UserName).").

As shown, the document miner and rule generator 108 may include one or more components. A chunker 112 intakes a document and generates chunks of data and segmented versions of the data such as one or more of unary sentences and lists. For example, segmented versions may be in the form of a dictionary of candidate chunks with keys being plausible entries in rule templates and values of candidate text that are likely to be rules.

One a document is chunked, a rule inferer and miner 114 looks for potential rules in the chunks via pattern mining, keyword phrases, and/or grammar phrases. In some embodiments, the rule inferer and miner 114 includes or calls a natural language processing part of speech tagger to tag tokens (words) of each sentence in the chunks. As documents often organize key information in tables or a HTML/XML/JSON schema it makes automated retrieval easier. Such structure may facilitate mapping from sentences to a "target" code construct was may be used in a final rule.

Chunks are evaluated according to one or more of: 1) an analysis for imperative statements (e.g., can, must, will, shall, should, could, and would); 2) an analysis for alphanumeric constructs; and/or 3) keyword searching to look for text that may be a rule. The analysis of imperative statements and/or alphanumeric constructs is typically performed using regular expression (regex) analysis.

Imperative statements may come in the form of "one of many" and may be found using part-of-speech grammar regex. Alphanumeric constructs are also "one of many" and can be found using regex such as r""""NUMER: {<JJ.><NN.><.><CD><NN.>}"""". Keyword searches are keyword queries that are looking for words in phrases to include and/or exclude as potential rules.

Inferred rules are then mined for candidate rules by the rule inferer and miner 114. The rule inferer and miner 114 either excludes or includes an inferred rule based on phrases, grammar, etc. Included rules become the candidate rules.

The candidate rules are then classified as being or nor being a rule using a rule classifier 118. Depending upon the implementation, a multiclass classifier, sequence-to-sequence classifier, etc. may be used as the rule classifier 118. In some embodiments, the classification includes formatting the rule into a specific format such as a linter format.

The classified rules are then populated with extracted information to generated populated rules using rule populator 120. For example, rules for a lint (or linter) are generated. The populated rules may then be used as a part of a code development tool and/or code analysis tool 110 during application development.

In some embodiments, one or more of the document miner and rule generator 108, the document storage 104, and the code development tool and/or code analysis tool 110 are provided as services of a provider network. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface (s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The circles with numbers inside illustrate an exemplary flow of operations. At circle 1, an edge device 130 sends a request to the document miner and rule generator 108 to look at stored documents and generate rules from those documents. Examples of formats for requests are detailed herein. Additionally, in some embodiments, the document miner and rule generator 108 does not re-populate rules that already exist unless an aspect of the rules have change.

At circle 2, the document miner and rule generator 108 acquires documentation from the document storage 104 and at circle 3 the document miner and rule generator 108 analyzes that documentation for rules as detailed herein.

At circle 4, the document miner and rule generator 108 integrates the generated (e.g., populated) rules into the code development tool and/or code analysis tool 110. Note that this may not always happen.

At circle 5, the document miner and rule generator 108 sends an indication that the analysis is complete to the requesting edge device 130. In some embodiments, the document miner and rule generator 108 indicates where the rules are stored (or where they were integrated). In some embodiments, the document miner and rule generator 108 provides the rules to the requesting edge device 130 for it to incorporate into a code development tool and/or code analysis tool.

And, at circle 6, the edge device 130 utilizes the code development tool and/or code analysis tool 110 with the generated rules.

Figure 2:
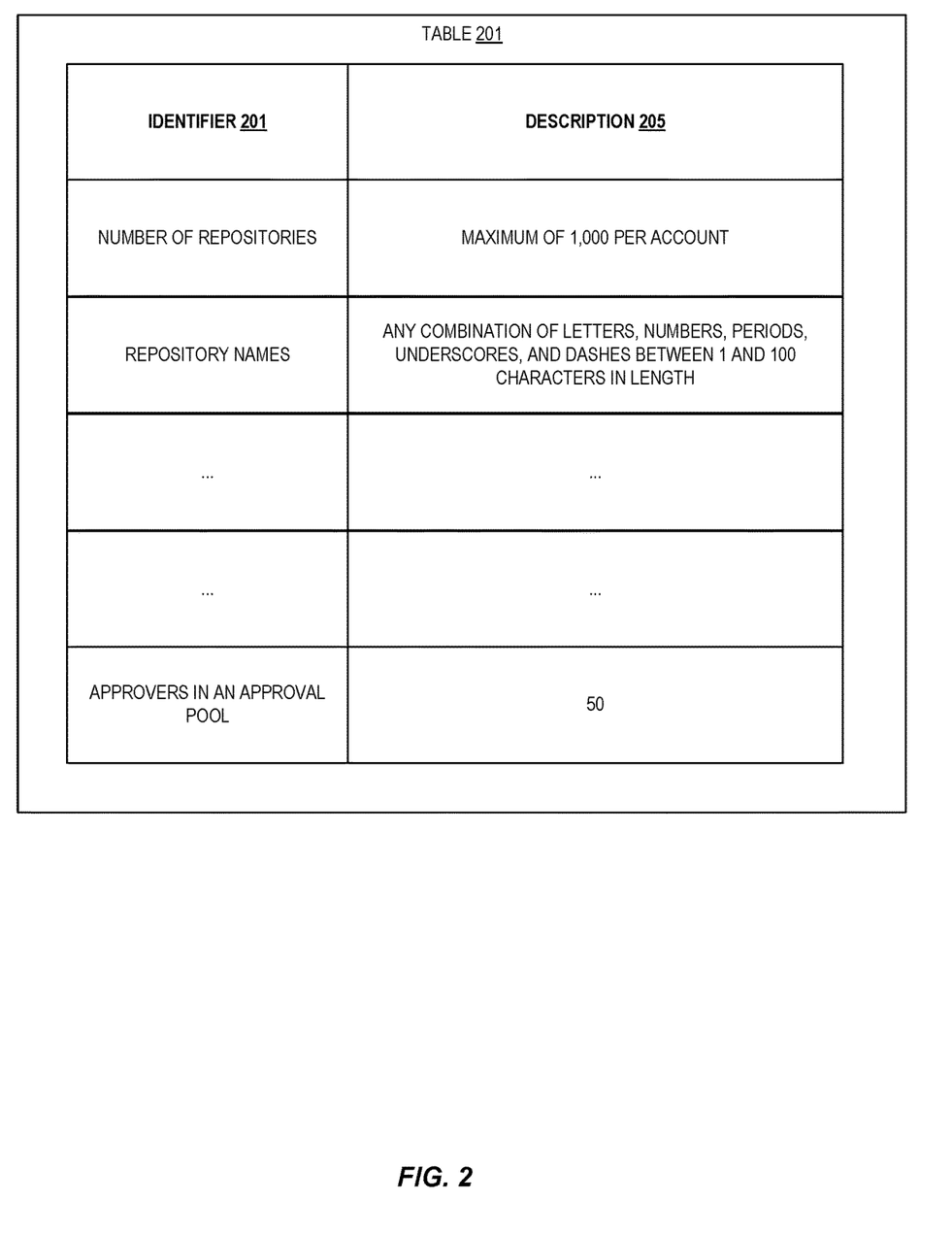
FIG. 2 illustrates an example of documentation organized in a tabular format.

FIG. 2 illustrates an example of documentation organized in a tabular format. As shown, a table 201 includes an identifier 201 of some item (e.g., a name) and a description 205 of the identified item. When organized as a table, documentation provides a clear link between items and how those items are to be used, etc.

In this example, the descriptions 205 provide a rule that must be followed. For example, repository names are to be any combination of letters, numbers, etc. Any repository name that does not follow that combination is not valid.

Figure 3:
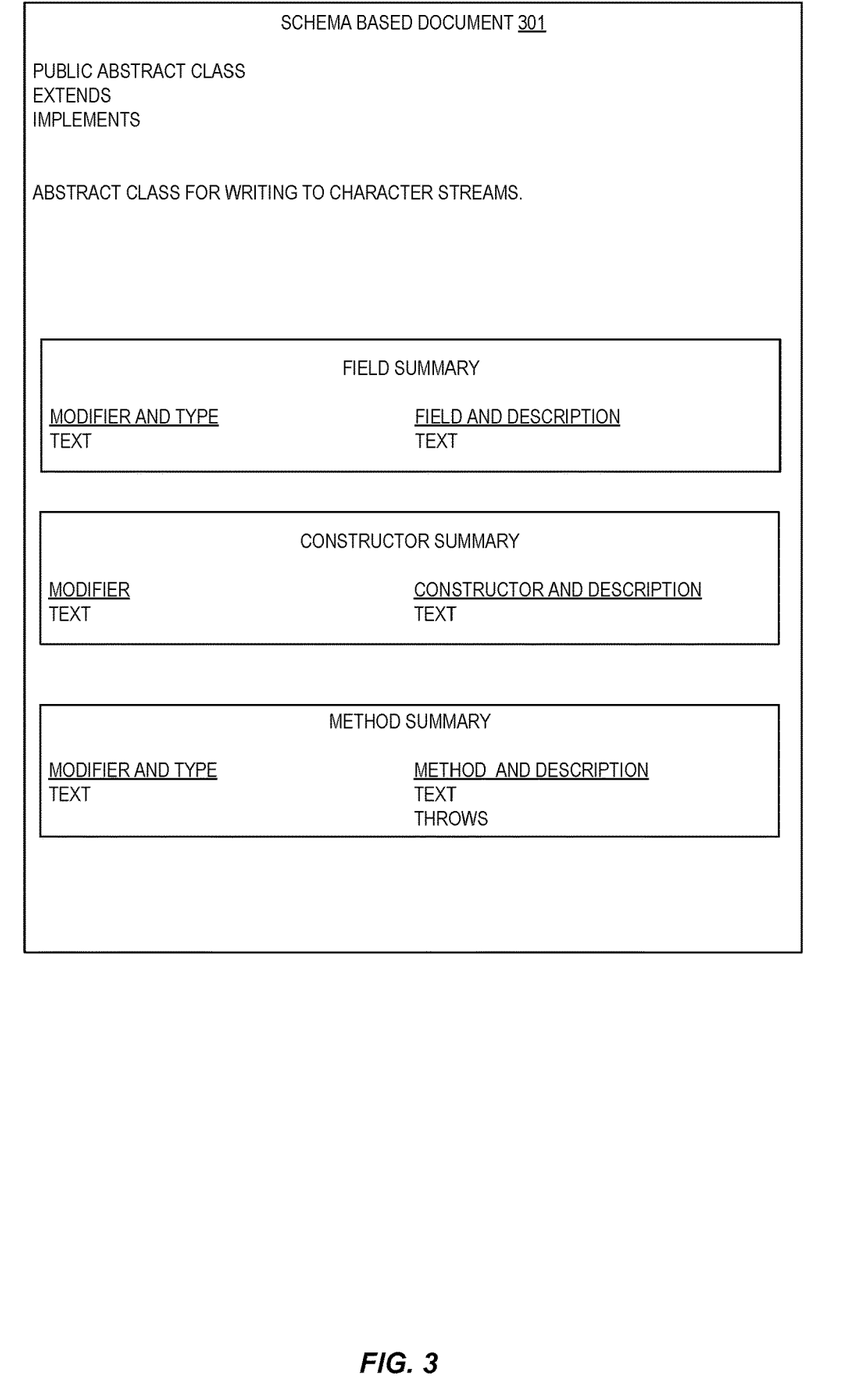
FIG. 3 illustrates an example of documentation organized in a schema format.

FIG. 3 illustrates an example of documentation organized in a schema format. As shown, the schema 301 has a particular format for how something is to be described. In this example, a class is described to including the fields of the class, constructors of the class, and a summary of the different methods of the class. This format may make mapping from sentences to a "target" code construct easier. Rules are usually found in a schema format in descriptions. In this example, throws indicate what could cause an error (and thus should be avoided).

Figure 4:
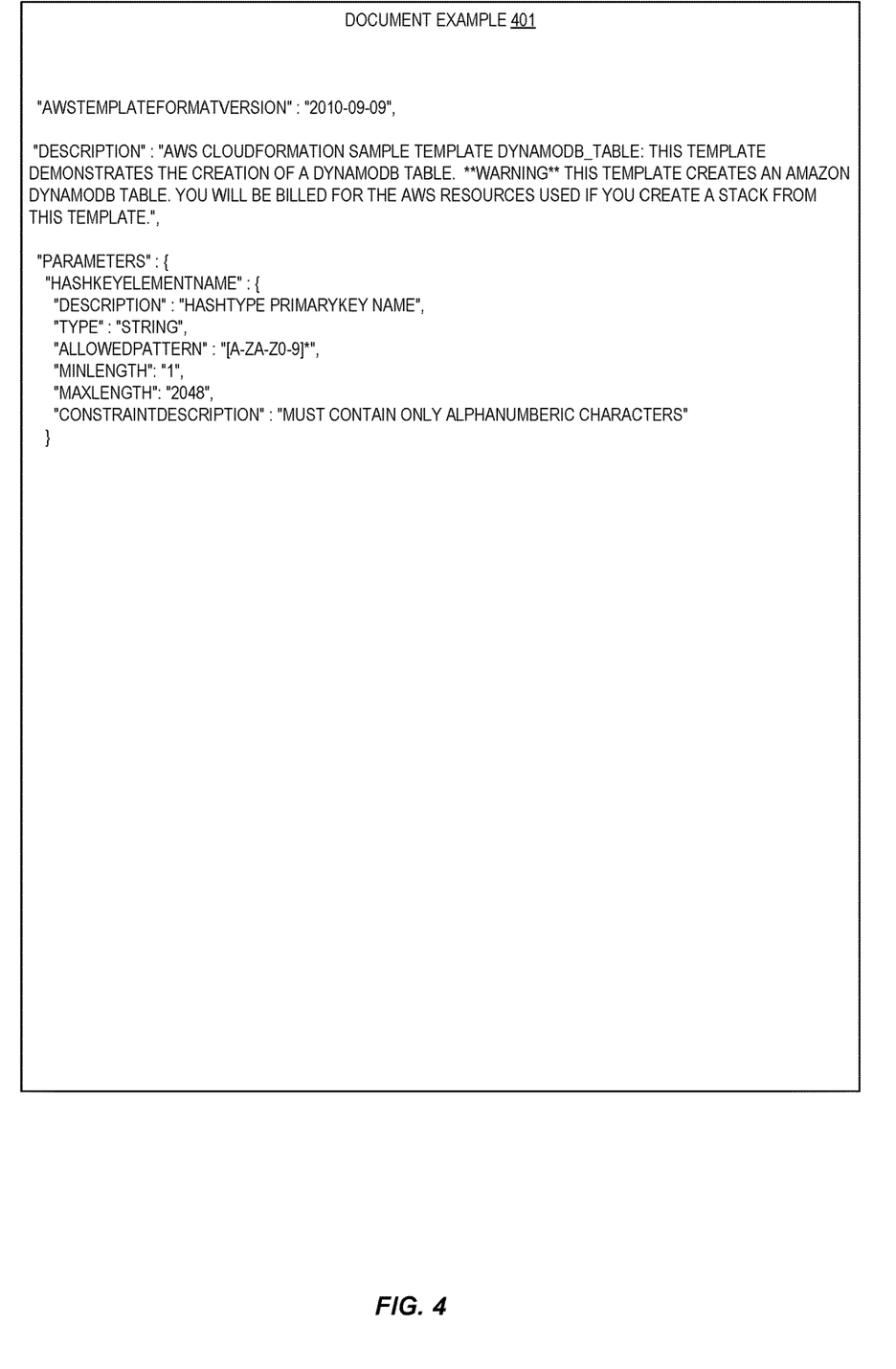
FIG. 4 illustrates an example of documentation that includes a list of potential rules.

FIG. 4 illustrates an example of documentation that includes a list of potential rules. In this example 401, the parameters for HASHKEYELEMENTNAME include what needs to be included such as a name that is a string, an allowed pattern, lengths (min and max), and a constraint on the description (it can only contain alphanumeric characters).

Figure 5:
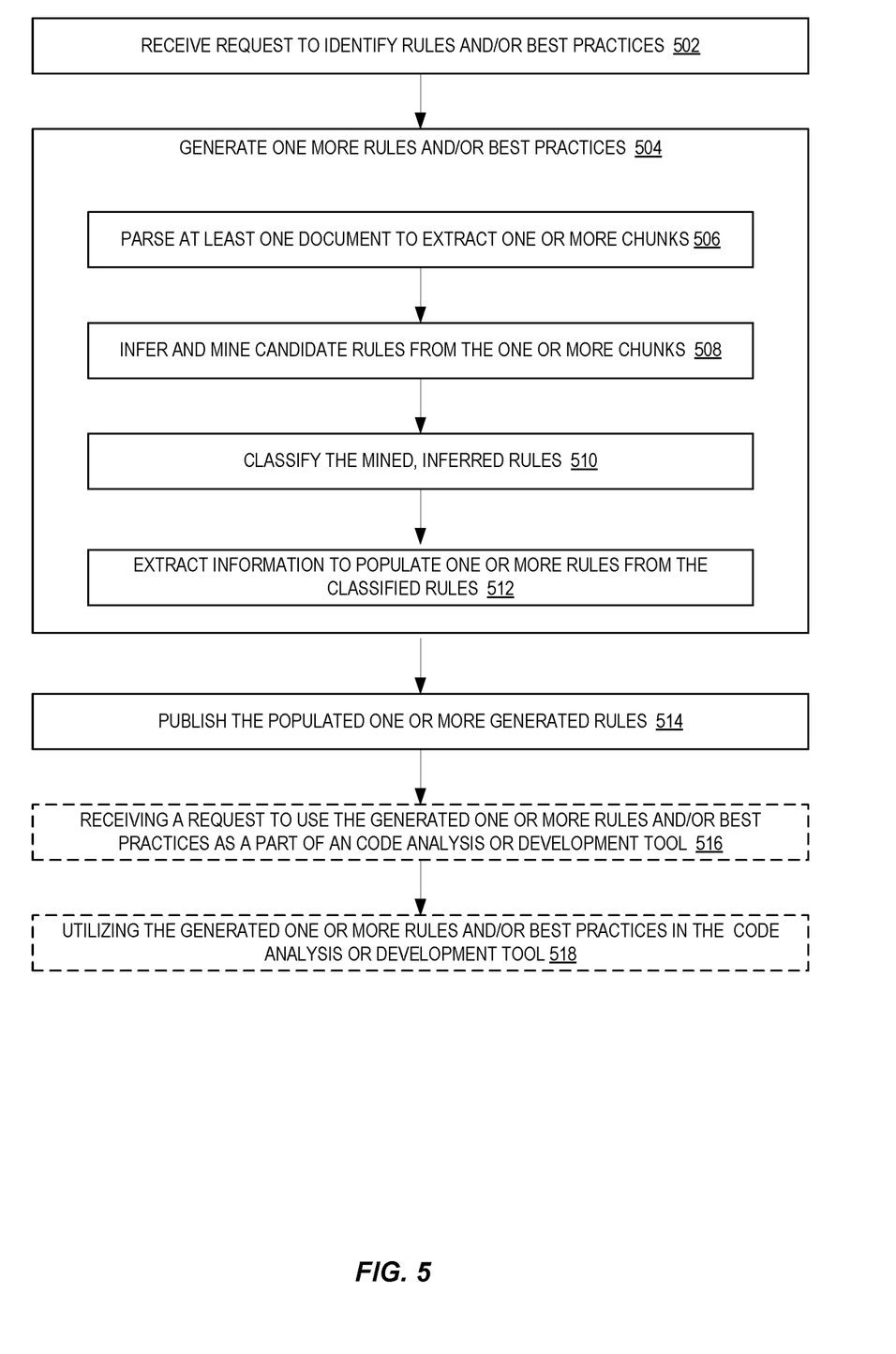
FIG. 5 is a flow diagram illustrating operations of a method for the automatic population of rules from documents according to some embodiments.

FIG. 5 is a flow diagram illustrating operations of a method for the automatic population of rules from documents according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the document miner and rule generator 108 of the other figures.

At 502, a request is received to identify rules and best practices. For example, an edge device requests that rules and/or best practices are identified from documentation. In some embodiments, the request includes one or more of an identifier of documentation or locations thereof, an identifier of the requester, an identifier of a location to store the rules, etc. For example, a request is received by the document miner and rule generator 108 which identifies particular documents of document storage 104.

One or more rules and/or best practices are generated from the documentation at 504. In particular, the document miner and rule generator 108 generates rules and/or best practices from the documentation.

At 506, one or more chunks are extracted from the documentation. For example, an XML document is parsed into chunk. Each chunk is a logical unit (e.g., a paragraph) of a document. Chunks may include raw text and/or a target. In some embodiments, chunks include a document revision/creation date if known.

Candidate rules are inferred from the one or more chunks at 508. Rules can be single aligned (e.g., a unary sentence) or composite if they contain a list. Candidate rules may be inferred by applying one or more techniques.

Common to the techniques is that chunks (or at least sentences thereof) are tagged using natural language processing part of speech (POS) tagging. For example, the sentence "String contains a maximum of 250 characters" may be POS tagged as [('String', 'VBG'), ('contains', 'VBZ'), ('a', 'DT'), ('maximum', 'NN'), ('of', 'IN'), ('250', 'CD'), ('characters', 'NNS')]. In some embodiments, the POS tags are as follows:

| | | |
|---|---|---|
| 1. | CC | Coordinating conjunction |
| 2. | CD | Cardinal number |
| 3. | DT | Determiner |
| 4. | EX | Existential there |
| 5. | FW | Foreign word |
| 6. | IN | Preposition or subordinating conjunction |
| 7. | JJ | Adjective |
| 8. | JJR | Adjective, comparative |
| 9. | JJS | Adjective, superlative |
| 10. | LS | List item marker |
| 11. | MD | Modal |
| 12. | NN | Noun, singular or mass |
| 13. | NNS | Noun, plural |
| 14. | NNP | Proper noun, singular |
| 15. | NNPS | Proper noun, plural |
| 16. | PDT | Predeterminer |
| 17. | POS | Possessive ending |
| 18. | PRP | Personal pronoun |
| 19. | PRP$ | Possessive pronoun |
| 20. | RB | Adverb |
| 21. | RBR | Adverb, comparative |
| 22. | RBS | Adverb, superlative |
| 23. | RP | Particle |
| 24. | SYM | Symbol |
| 25. | TO | to |
| 26. | UH | Interjection |
| 27. | VB | Verb, base form |
| 28. | VBD | Verb, past tense |
| 29. | VBG | Verb, gerund or present participle |
| 30. | VBN | Verb, past participle |
| 31. | VBP | Verb, non-3rd person singular present |
| 32. | VBZ | Verb, 3rd person singular present |
| 33. | WDT | Wh-determiner |
| 34. | WP | Wh-pronoun |
| 35. | WP$ | Possessive wh-pronoun |
| 36. | WRB | Wh-adverb |

In some embodiments, a keyword inference for rules is performed. In particular, the keyword search is looking for a list of phrases to exclude (not likely to be a rule) or include (more likely to be a rule). For example, searching for inclusionary keywords such as available, valid, acceptable, allowed, minimum, maximum value, etc. versus exclusionary words. For example, the text "Valid values for this parameter are: memcached|redis" includes the keyword valid and is likely to be a rule. In the particular document with this text, the target for this potential rule could be found by inference of the text "The name of the cache engine (memcached or redis) to be used for this cluster." The result of this keyword inference is "Valid values for this parameter are: memcached|redis (Target: AWS::ElastiCache::CacheCluster.Engine)".

In some embodiments, an imperative inference for rules is performed. In particular, an imperative (e.g., "must," "require," etc.) is looked for. For example, a regular expression analysis using r""""IMPRTV: {<MD><.><RB>} may be made where IMPRTV is a list of one or more imperatives. An example of a potential rule found using imperative searching may text such as "A CORS rule can have only one MaxAgeSeconds element." (Target: AWS::S3:::Container.CorsRule.MaxAgeSeconds) where the imperative is "can." Note that the regex may be hardcoded or machine learned.

In some embodiments, an alphanumeric inference for rules is performed. In particular, an alphanumeric construct is searching for a rule based on a grammar. This grammar may be known from a schema, machine learned, etc. In some embodiments, a plurality of grammars is used to search for potential rules. Note that for this type if inference, the sentences are typically first word tokenized and then tagged with the POS.

An example of a regex to be used in alphanumeric inference for rules is r""""NUMER: {<JJ.><NN.><.><CD><NN.>}"""". An example of a potential rule found using alphanumeric constructions is "The range of valid ports is one (1) through 65535.(Target: LoadBalancer.HealthCheck.Target)," etc.

Note that the regex may be hardcoded or machine learned. For example, in some embodiments, domain knowledge is used to detect initial set of sentences containing numbers (such as POS tag <CD>) or modal verbs like must/should (such as POS tag <MD>). Then a set of example rules are curated and a frequent subsequence mining algorithm is used to identify and fine-tune additional patterns of POS tags. Additionally, in some embodiments, a classification approach is used to distinguish rules versus non-rules based on keyword and POS-tag features.

In some embodiments, words, etc. are made case consistent (e.g., made lowercase) prior to regex or keyword analysis.

Additionally, at 508 the inferred candidate rules are mined for rules to include and rules to exclude. Note that in some embodiments, this mining is a part of the candidate rule inference such that excluded rules are thrown out during regex and/or keyword searching. Excluded rules are those that are more likely to result in false positives. In particular, one or more exclusion factors such as patterns, phrases, keywords, alphanumeric constructs, etc. are used to exclude inferred rules. The exclusion factors may be hardcoded or learned (e.g., using S2S, etc.).

The mined, inferred rules are classified at 510. In some embodiments, the classification is performed using a trained multiclass classifier. In some embodiments, the classification is performed using a trained sequence-to-sequence (S2S) model where an input to the S2S model is a sentence and the output is JSON. The S2S model is typically trained with matched pairs. A rule may be classified by its constituent parts such as a source (the document that provided the rule), a target for the rule, text for the rule, and/or parameters for the rule (e.g., specific values such as 250, etc.). In some embodiments, the rules are formatted (e.g., into a lint-based format) before mining.

Figure 6:
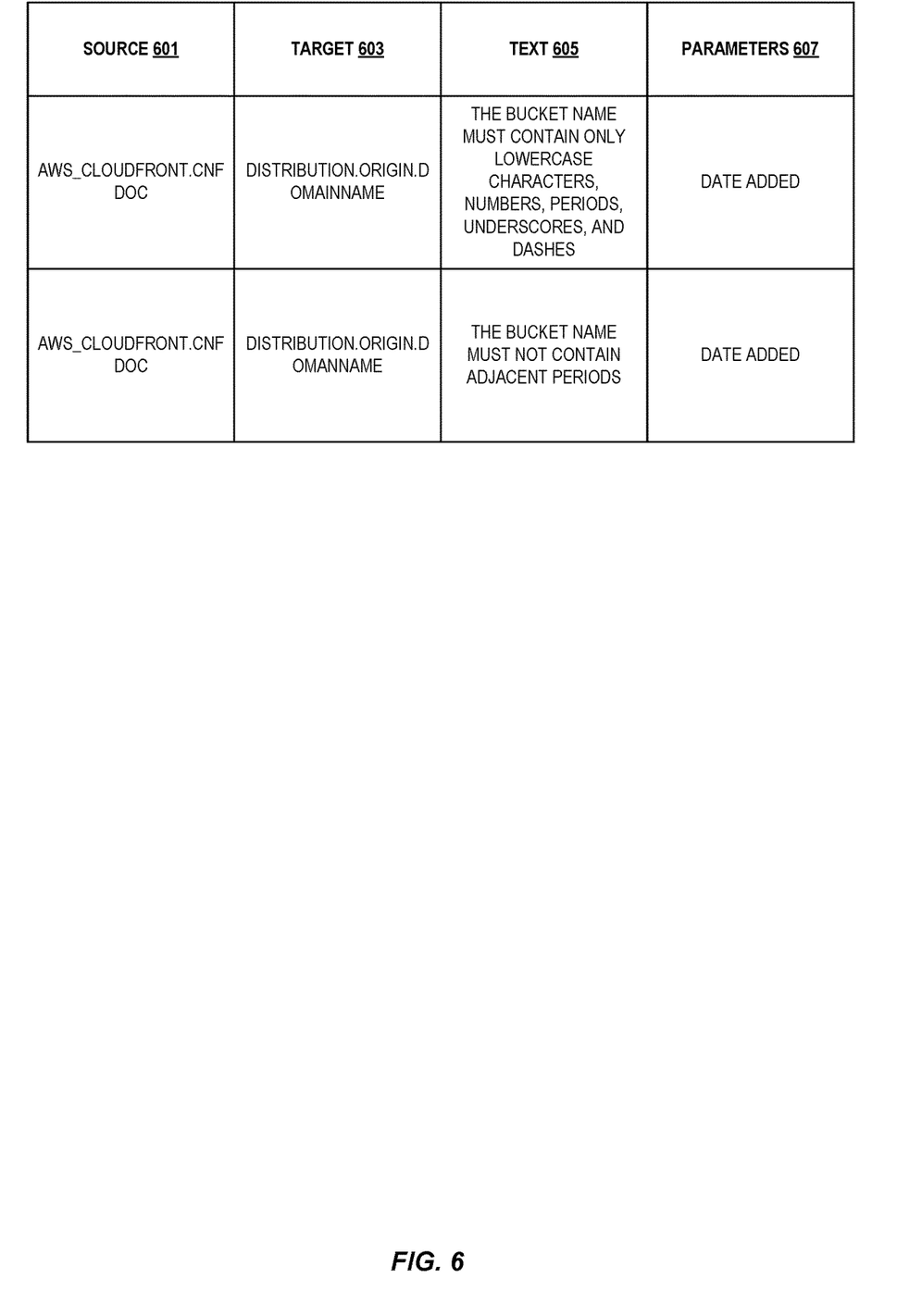
FIG. 6 illustrates exemplary embodiments of a plurality of rules.

At 512, information is extracted from the documents and/or previous acts to populate one or more rules from the classified rules. In some embodiments, this may include a check to ensure that a rule is not duplicated. FIG. 6 illustrates exemplary embodiments of a plurality of rules. As shown, an exemplary rule includes the source of the rule 601, a target of the rule 603, text associated with the rule 605, and parameters of the rule 607. Parameters 607 may include specific values (e.g., min, max, etc.), a date of the rule (which may be used to determine whether a rule should be overwritten), etc.

The populated one or more rules and/or best practices are published at 514. Publication may include incorporating into an IDE, making available for accessing, etc.

In some embodiments, a code evaluation request is received to use the generated rules to evaluate code at 516. The generated rules are used as a part of a code analysis or development tool.

In some embodiments, the code analysis or development tool utilizes the generated rules to evaluate the code according to the code evaluation request at 518.

Figure 7:
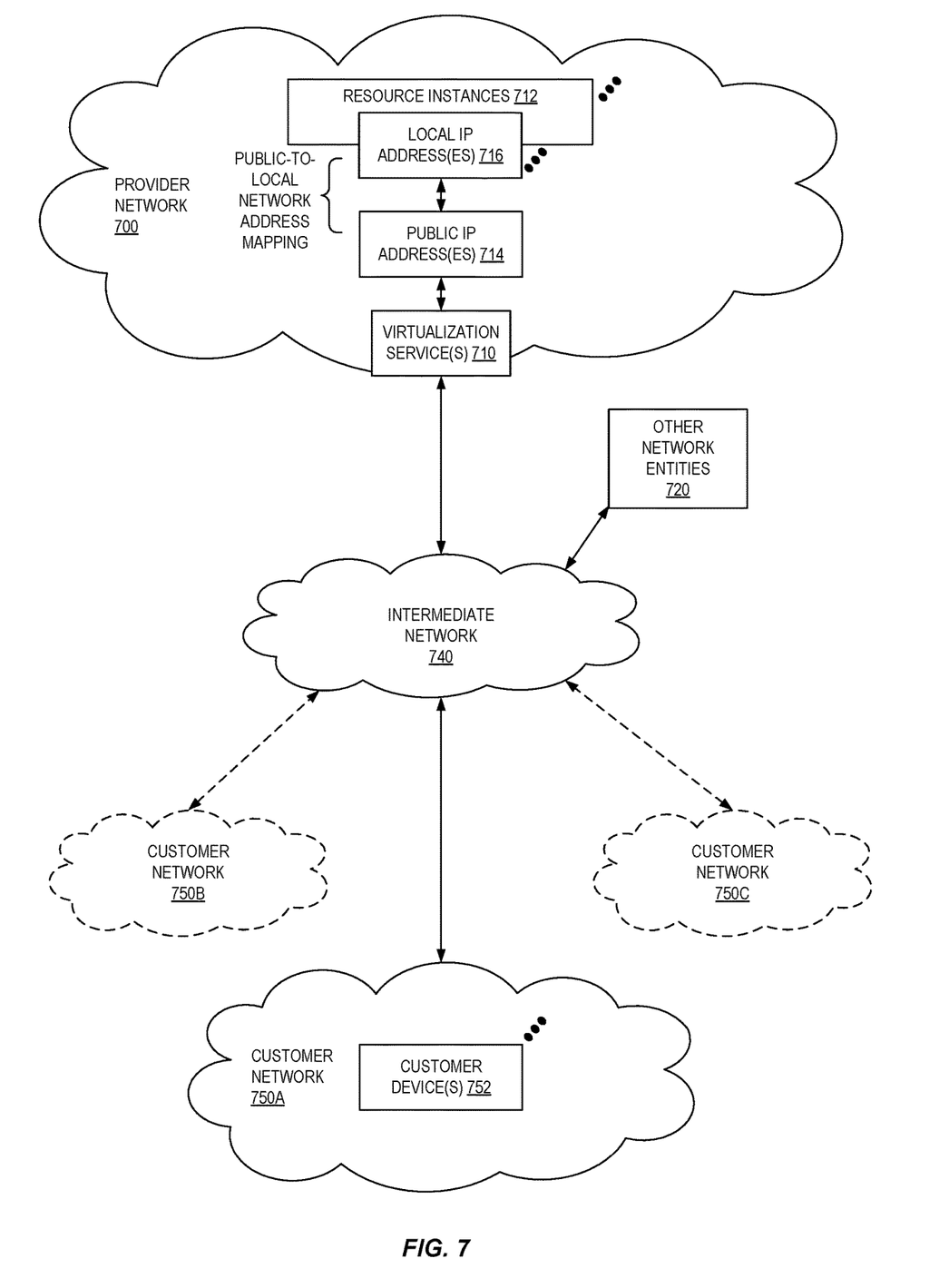
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
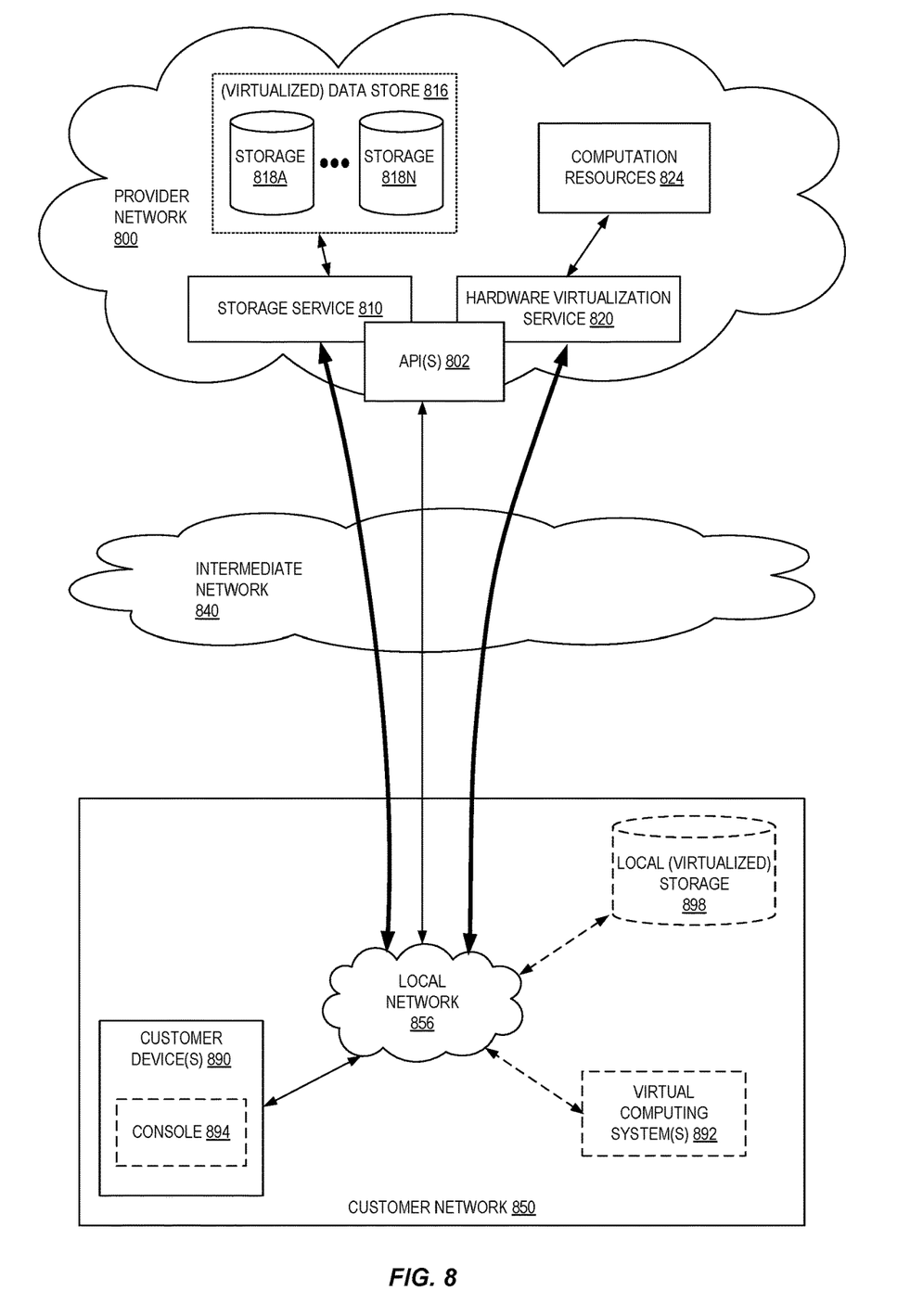
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
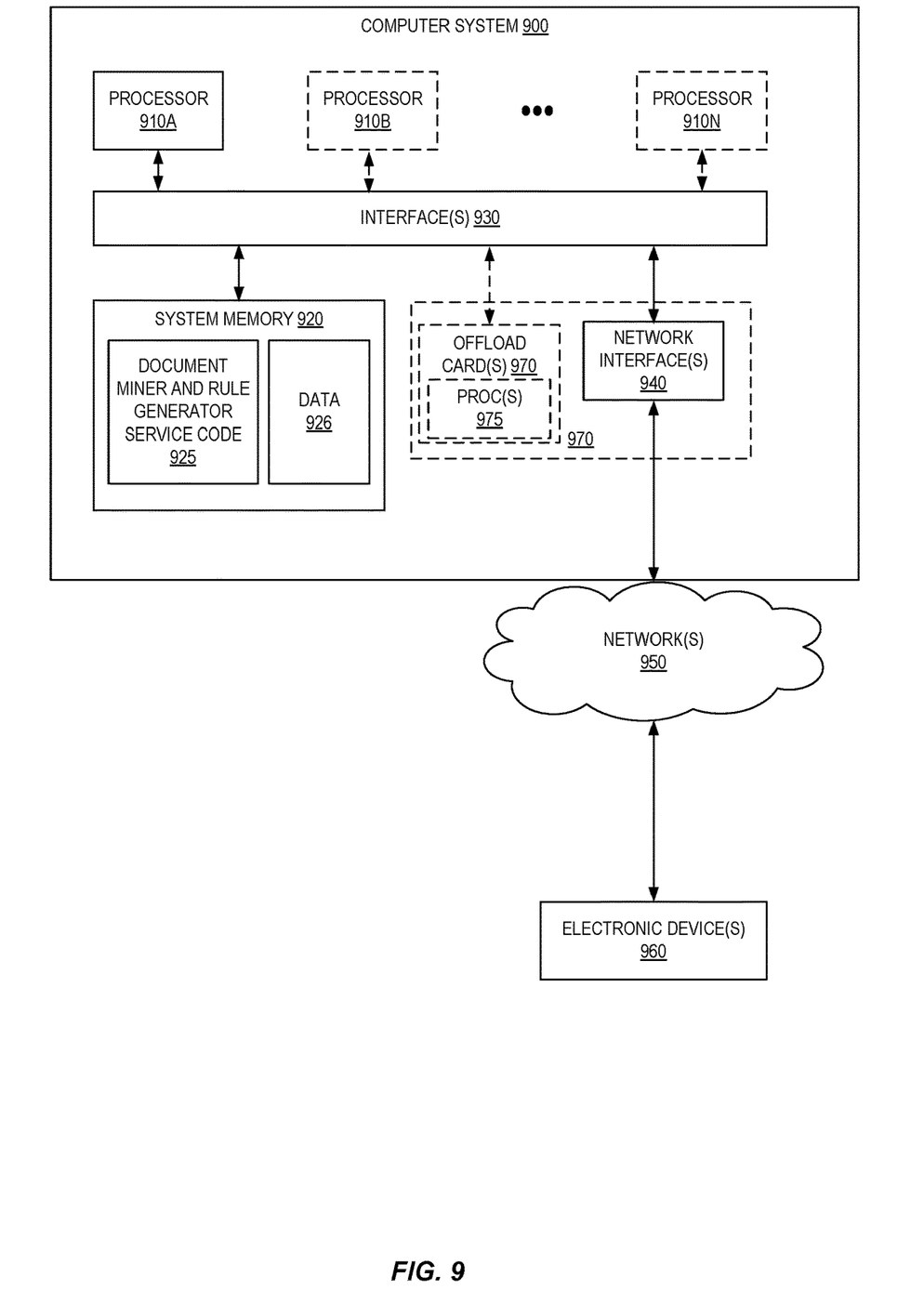
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as document miner and rule generator service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, at a provider network, a request to evaluate software documentation for at least one rule;
    responsive to the request, retrieving, by a document miner and rule generator in the provider network, the software documentation from a document storage in the provider network;
    extracting, by the document miner and rule generator in the provider network, a plurality of chunks from the software documentation;
    inferring, by the document miner and rule generator in the provider network, one or more candidate rules from the extracted chunks by performing one or more of: keyword searching for phrases associated with rules, performing a regular expression analysis for imperatives within the extracted chunks, and performing a regular expression analysis for alphanumeric text within the extracted chunks;
    mining, by the document miner and rule generator in the provider network, the inferred one or more candidate rules to determine at least one of the one or more candidate rules is to be included in rule generation;
    classifying, by the document miner and rule generator in the provider network, the at least one mined one or more candidate rules as one or more rules;

extracting, by the document miner and rule generator in the provider network, information to generate the one or more rules;

integrating, by the document miner and rule generator in the provider network, the generated rules into a code review tool in the provider network; and utilizing, by an edge device, the code review tool in the provider network to evaluate code with the generated rules in the provider network.

2. The computer-implemented method of claim 1, wherein the request includes an identifier of a location for the software documentation and an identifier of an integrated development environment.

3. The computer-implemented method of claim 1, wherein the software documentation is text-based.

4. A computer-implemented method comprising:

extracting, by a document miner and rule generator in a provider network, a plurality of chunks from documentation stored in document storage in the provider network;

inferring, by the document miner and rule generator in the provider network, one or more candidate rules from the extracted chunks;

mining, by the document miner and rule generator in the provider network, the inferred one or more candidate rules to determine at least one of the one or more candidate rules is to be included in rule generation;

classifying, by the document miner and rule generator in the provider network, the at least one mined one or more candidate rules as one or more rules; and extracting, by the document miner and rule generator in a provider network, information to generate one or more rules;

integrating, by the document miner and rule generator in the provider network, the generated rules into a code review tool in the provider network; and wherein an edge device utilizes the code review tool in the provider network to evaluate code with the generated rules in the provider network.

5. The computer-implemented method of claim 4, wherein one or more of the one or more documents include tabular formatted information.

6. The computer-implemented method of claim 4, wherein one or more of the one or more documents are based on a text-based schema.

7. The computer-implemented method of claim 4, wherein inferring one or more candidate rules from the extracted chunks comprises performing a regular expression analysis for imperatives within the extracted chunks, performing a regular expression analysis for alphanumeric text within the extracted chunks, or keyword searching for phrases associated with rules.

8. The computer-implemented method of claim 4, wherein the generated one or more rules are published to a location accessible to a code developer.

9. The computer-implemented method of claim 4, wherein the documentation includes text-based documentation include one or more of XML documents, JSON documents, and HTML documents.

10. The computer-implemented method of claim 4, wherein the classifying is performed using one of a sequence-to-sequence model and a multiclass classifier.

11. The computer-implemented method of claim 4, further comprising:

incorporating the generated one or more rules into a linter.

12. The computer-implemented method of claim 4, further comprising:

incorporating the generated one or more rules into an integrated development environment.

13. The computer-implemented method of claim 4, wherein inferring one or more candidate rules from the extracted chunks comprises performing a regular expression analysis for imperatives within the extracted chunks, performing a regular expression analysis for alphanumeric text within the extracted chunks, and keyword searching for phrases associated with rules.

14. A system comprising:

a storage for a plurality of documents;

one or more electronic devices to implement a document miner and rule generator service in the multi-tenant provider network, the document miner and rule generator service including instructions that upon execution cause the document miner and rule generator service to:

generate one or more rules from documentation by:

extracting a plurality of chunks from the plurality of documents, inferring one or more candidate rules from the extracted chunks, mining the inferred one or more candidate rules to determine at least one of the one or more candidate rules is to be included in rule generation, classifying the at least one mined one or more candidate rules as one or more rules, and extracting information to generate the one or more rules;

one or more electronic devices to implement a code review tool in the multi-tenant provider network, the code review tool including instructions that upon execution cause the code review tool to integrate the generated rules into the code review tool; and an edge device configured to utilize the code review tool in the provider network to evaluate code with the generated rules in the provider network.

15. The system of claim 14, wherein inferring one or more candidate rules from the extracted chunks comprises performing a regular expression analysis for imperatives within the extracted chunks.

16. The system of claim 14, wherein inferring one or more candidate rules from the extracted chunks comprises performing a regular expression analysis for alphanumeric text within the extracted chunks.

17. The system of claim 14, wherein inferring one or more candidate rules from the extracted chunks comprises keyword searching for phrases associated with rules.

18. The system of claim 14, wherein the generated one or more rules are published to a location accessible to a code developer.

19. The system of claim 14, wherein the classifying is performed using one of a sequence-to-sequence model and a multiclass classifier.

20. The system of claim 14, wherein the instructions that upon execution cause the document miner and rule generator service to infer the one or more candidate rules from the extracted chunks comprise instructions that upon execution cause the document miner and rule generator to perform a regular expression analysis for imperatives within the extracted chunks, to perform a regular expression analysis for alphanumeric text within the extracted chunks, and to keyword search for phrases associated with rules.

* * * * *